(No Model.)

N. F. WHIPPLE.
TEA OR COFFEE STRAINER.

No. 470,026. Patented Mar. 1, 1892.

Witnesses:
Alfred J. Johnson Jr.
W. G. March.

Inventor
Nathan F. Whipple
by his atty.
E. W. Blodgett

UNITED STATES PATENT OFFICE.

NATHAN F. WHIPPLE, OF PAWTUCKET, RHODE ISLAND.

TEA OR COFFEE STRAINER.

SPECIFICATION forming part of Letters Patent No. 470,026, dated March 1, 1892.

Application filed May 15, 1890. Renewed October 29, 1891. Serial No. 410,172. (No model.)

*To all whom it may concern:*

Be it known that I, NATHAN F. WHIPPLE, a citizen of the United States, residing at Pawtucket, in the county of Providence and State of Rhode Island, have invented certain new and useful Improvements in Tea or Coffee Strainers; and I do hereby declare that the following is a full, clear, and exact description of the invention, which will enable others skilled in the art to which it appertains to make and use the same.

My invention relates to improvements in strainers for tea or coffee pots; and my object is to provide a strainer and drip-cup combined in one which will be compact and will catch any drip falling from the nose of the pot, preventing the same from falling on the cloth. I accomplish this by the mechanism illustrated in the accompanying drawings, in which—

Figure 2:
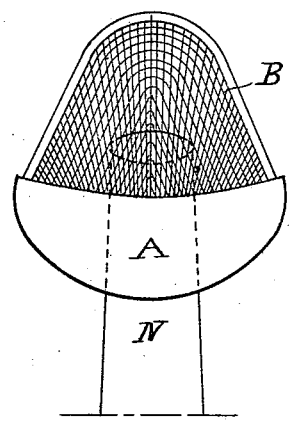
Figure 1:
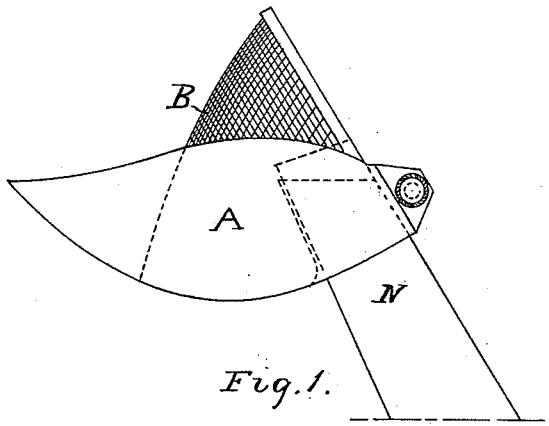

Figure 1 represents a side elevation of the cup mounted upon the nose of the pot, and Fig. 2 a front view of the drip-cup and strainer.

In Fig. 1, A designates a metal cup, (metal being preferred,) which is made to fit closely around the nose N of the pot, near the mouth, thus forming a collar. This collar can be constructed to adjust itself to any size of nose by means of a slot and thumb-screw. This cup is constructed of an elliptical shape, the rear forming a collar adjustable to any size of nose, and is set at such an angle to the nose that when the pot rests upon the table the cup extends horizontally and will hold any drops falling from the nose.

The strainer B (see Fig. 2) is a small sieve secured to the sides and bottom of the cup near the center thereof in such a manner that any liquid passing from the nose to the receptacle therefor must necessarily pass through and be strained by said sieve. When the pot is restored to its upright position it will be observed that the cup will resume its horizontal position and catch any drops falling from the pot.

The advantages of my arrangement are obvious and need not be referred to here.

What I claim is—

In strainers for tea and coffee pots, a cup A, elliptical in shape, secured to the nose of a pot and extending at a right or oblique angle therefrom, and a strainer B, which fits closely around and is secured to the interior walls of said cup, forming a perforated division bisecting the elliptical cup, all substantially as described.

In testimony whereof I have hereunto set my hand in the presence of subscribing witnesses.

NATHAN F. WHIPPLE.

In presence of—
JASON E. LAWRENCE,
EDWARD W. BLODGETT.